(12) United States Patent
Jiang et al.

(10) Patent No.: US 11,109,374 B2
(45) Date of Patent: Aug. 31, 2021

(54) METHOD AND DEVICE IN UE AND BASE STATION FOR WIRELESS COMMUNICATION

(71) Applicants: Qi Jiang, Shanghai (CN); XiaoBo Zhang, Shanghai (CN); Lin Yang, Shanghai (CN)

(72) Inventors: Qi Jiang, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 132 days.

(21) Appl. No.: 16/699,120

(22) Filed: Nov. 29, 2019

(65) Prior Publication Data

US 2020/0178249 A1    Jun. 4, 2020

(30) Foreign Application Priority Data

Dec. 3, 2018  (CN) .......................... 201811464456.8

(51) Int. Cl.
  *H04W 72/04*   (2009.01)
  *H04W 88/10*   (2009.01)
  *H04W 88/06*   (2009.01)

(52) U.S. Cl.
  CPC ... *H04W 72/0446* (2013.01); *H04W 72/0413* (2013.01); *H04W 72/0453* (2013.01); *H04W 88/06* (2013.01); *H04W 88/10* (2013.01)

(58) Field of Classification Search
  CPC . H04L 5/0044; H04L 27/0006; H04L 1/1822; H04L 1/1896; H04L 5/0055; H04L 5/0064; H04L 5/0094; H04L 5/0053; H04W 16/14; H04W 72/042; H04W 72/0446; H04W 72/0453; H04W 88/10; H04W 88/06; H04W 72/0413
  See application file for complete search history.

(56) References Cited

U.S. PATENT DOCUMENTS

| | | | |
|---|---|---|---|
| 6,864,838 B2* | 3/2005 | Harles | G01S 13/325 342/375 |
| 2017/0367087 A1* | 12/2017 | Seo | H04W 76/14 |
| 2020/0169440 A1* | 5/2020 | Thomas | H04L 27/2613 |
| 2020/0383132 A1* | 12/2020 | Yang | H04L 1/1819 |

FOREIGN PATENT DOCUMENTS

WO    WO-2018145258 A1 *  8/2018  ............ H04W 72/12

* cited by examiner

*Primary Examiner* — Dady Chery

(57) ABSTRACT

The disclosure provides a method and a device in a User Equipment (UE) and a base station for wireless communication. The UE first receives a first signaling, the first signaling indicating to transmit a first bit block in a first time-frequency resource block, then receives a second signaling, the second signaling indicating to transmit a second bit block in a second time-frequency resource block, and finally transmits a second radio signal in the second time-frequency resource block; the second bit block is used for generating the second radio signal; the first bit block includes a first bit subblock and a second bit subblock; the transmission mode in the first time-frequency resource block is associated with a relationship between an end time of time-frequency resources in the first time-frequency resource block assigned to the first bit subblock and a start time of the second time-frequency resource block.

20 Claims, 13 Drawing Sheets

METHOD AND DEVICE IN UE AND BASE STATION FOR WIRELESS COMMUNICATION

CROSS-REFERENCE TO RELATED APPLICATION

This application claims the priority benefit of Chinese Patent Application Serial Number 201811464456.8, filed on Dec. 3, 2018, the full disclosure of which is incorporated herein by reference.

BACKGROUND

Technical Field

The disclosure relates to transmission methods and devices in wireless communication systems, and in particular to a communication method and a communication device transmitting Enhance Mobile Broadband (eMBB) and Ultra Reliable and Low Latency Communication (URLLC) services simultaneously in wireless communication.

Related Art

In 5G systems, Enhance Mobile Broadband (eMBB) and Ultra Reliable and Low Latency Communication (URLLC) are two typical service types. A new Modulation and Coding Scheme (MCS) table has been defined for requirements of lower target BLER ($10^{-5}$) of URLLC services in the 3rd Generation Partner Project (3GPP) New Radio (NR) Release 15.

In order to support URLLC services of higher requirements, for example, higher reliability (eg. target BLER is $10^{-6}$), lower latency (eg. 0.5-1 ms), etc., the 3GPP Radio Access Network (RAN) #80 session had approved a Study Item (SI) of URLLC enhancement of NR Release 16, in which enhancements to Hybrid Automatic Repeat reQuest (HARQ) feedback/Channel State Information (CSI) feedback are a key point to be studied.

SUMMARY

In Long-term Evolution (LTE), LTE-Advanced (LTE-A) and Release-15 NR systems, in order to guarantee uplink coverage and reception performance of Uplink Control Information (UCI), a User Equipment (UE) transmits only one uplink channel including a HARQ feedback in one subframe or one timeslot. In order not to lose a Hybrid Automatic Repeat request-Acknowledgement (HARQ-ACK), HARQ-ACKs for different service requirements are multiplexed into one uplink channel, for example, a Short Latency Physical Uplink Control Channel (sPUCCH) in a Short Transmission Time Interval (STTI) includes a HARQ-ACK corresponding to a Physical Downlink Control Channel (PDSCH) of a normal Transmission Time Interval (TTI). When uplink data of sTTI and uplink data of TTI are located in one same subframe, the UE will drop the uplink data of TTI, but transmit the uplink data of sTTI only. In NE Release 16, considering that the capacity of the UE is enhanced, the solution in sTTI will be re-optimized.

In view of the above problems, the disclosure provides a solution for a UE and a base station. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred. Further, although the disclosure is initially designed for scenarios of simultaneous transmission of eMBB and URLL, the disclosure is also applicable to other scenarios.

The disclosure provides a method in a UE for wireless communication, wherein the method includes:

receiving a first signaling, the first signaling indicating to transmit a first bit block in a first time-frequency resource block;

receiving a second signaling, the second signaling indicating to transmit a second bit block in a second time-frequency resource block; and transmitting a second radio signal in the second time-frequency resource block.

Herein, an end time of the second time-frequency resource block is behind a start time of the first time-frequency resource block, and the second bit block is used for generating the second radio signal; the first bit block includes a first bit subblock and a second bit subblock; when an end time of time-frequency resources in the first time-frequency resource block assigned to the first bit subblock is behind a start time of the second time-frequency resource block, the method in the UE for wireless communication includes:

giving up wireless transmission in the first time-frequency resource block.

Herein, the second bit block includes the first bit subblock

When an end time of time-frequency resources in the first time-frequency resource block assigned to the first bit subblock is before a start time of the second time-frequency resource block, the method in the UE for wireless communication includes:

transmitting a first radio signal in the first time-frequency resource block.

Herein, the first bit subblock is used for generating the first radio signal.

In one embodiment, the above method has the following benefits: the transmission mode in the first time-frequency resource block is associated with the end time of time-frequency resources of the first bit subblock and the start time of the second time-frequency resource block, which determines more flexibly whether to keep the transmission in the first time-frequency resource block compared with the method in sTTI, thereby avoiding waste of resources.

In one embodiment, one scenario of the above method is that: when an end time of time-frequency resources in the first time-frequency resource block assigned to the first bit subblock is behind a start time of the second time-frequency resource block, it is indicated that time-domain resources occupied by an eMBB UCI are later than time-domain resources occupied by a URLLC UCI, then the eMBB UCI is merged into the URLLC UCI to be transmitted.

In one embodiment, another scenario of the above method is that: when an end time of time-frequency resources in the first time-frequency resource block assigned to the first bit subblock is before a start time of the second time-frequency resource block, it is indicated that time-domain resources occupied by an eMBB UCI are earlier than time-domain resources occupied by a URLLC UCI, then the eMBB UCI is still transmitted in resources of eMBB, that is to say, the UE will transmit two Time Domain Multiplexing (TDM) UCIs in one subframe or one timeslot, and the two TDM UCIs correspond to the eMBB UCI and the URLLC UCI respectively.

According to one aspect of the disclosure, the above method is characterized in that: when an end time of time-frequency resources in the first time-frequency resource block assigned to the first bit subblock is before a start time of the second time-frequency resource block, the method in the UE for wireless communication includes:

giving up wireless transmission after the end time of the time-frequency resources in the first time-frequency resource block assigned to the first bit subblock.

In one embodiment, the above method is characterized in that: the transmission in the first time-frequency resource block lasts just until the time-domain resources occupied by the first bit subblock, so as to guarantee that the transmission of the first radio signal is not overlapping with the transmission of the second radio signal in time domain.

According to one aspect of the disclosure, the above method is characterized in that: when an end time of time-frequency resources in the first time-frequency resource block assigned to the first bit subblock is before a start time of the second time-frequency resource block, the UE gives up wireless transmission after the end time of the time-frequency resources in the first time-frequency resource block assigned to the first bit subblock, and partial or all bits in the second bit subblock are used for generating the first radio signal; an end time of time-frequency resources in the first time-frequency resource block assigned to the partial or all bits in the second bit subblock is a second time, the end time of time-frequency resources in the first time-frequency resource block assigned to the first bit subblock is a first time, and the second time is not later than the first time.

In one embodiment, the above method has the following benefits: when time-frequency resources assigned to an eMBB UCI are earlier than time-frequency resources assigned to a URLLC UCI, and when the eMBB UCI is piggybacked on a PUSCH, the eMBB UCI and partial uplink data earlier than the eMBB UCI will be kept transmitted, to improve performance; however, the data in the eMBB PUSCH later than the URLLC UCI will be dropped so as to avoid performance impact to URLLC.

According to one aspect of the disclosure, the above method is characterized in that: when an end time of time-frequency resources in the first time-frequency resource block assigned to the first bit subblock is before a start time of the second time-frequency resource block, the UE transmits the first radio signal in the first time-frequency resource block; the first bit subblock is used for generating the first radio signal and partial or all bits in the second bit subblock are used for generating the first radio signal; and an end time of time-frequency resources in the first time-frequency resource block assigned to the partial or all bits in the second bit subblock is before the start time of the second time-frequency resource block.

In one embodiment, the above method has the following benefits: when time-frequency resources assigned to an eMBB UCI are earlier than time-frequency resources assigned to a URLLC UCI, and when the eMBB UCI is piggybacked on a PUSCH, the eMBB UCI and partial uplink data earlier than the URLLC UCI will be kept transmitted, to improve performance.

According to one aspect of the disclosure, the above method includes:

determining that a first time window and a second time window are overlapping in time domain.

Herein, the first time window includes time-domain resources occupied by the first time-frequency resource block, and the second time window includes time-domain resources occupied by the second time-frequency resource block.

According to one aspect of the disclosure, the above method includes:

receiving a third radio signal.

Herein, the first bit subblock is used for determining whether the third radio signal is correctly received According to one aspect of the disclosure, the above method includes:

receiving a fourth radio signal.

Herein, the second bit block is used for determining whether the fourth radio signal is correctly received.

The disclosure provides a method in a base station for wireless communication, wherein the method includes:

transmitting a first signaling, the first signaling indicating to receive a first bit block in a first time-frequency resource block;

transmitting a second signaling, the second signaling indicating to receive a second bit block in a second time-frequency resource block; and receiving a second radio signal in the second time-frequency resource block.

Herein, an end time of the second time-frequency resource block is behind a start time of the first time-frequency resource block, and the second bit block is used for generating the second radio signal; the first bit block includes a first bit subblock and a second bit subblock; when an end time of time-frequency resources in the first time-frequency resource block assigned to the first bit subblock is behind a start time of the second time-frequency resource block, the method in the base station for wireless communication includes:

giving up wireless receiving in the first time-frequency resource block.

Herein, the second bit block includes the first bit subblock;

When an end time of time-frequency resources in the first time-frequency resource block assigned to the first bit subblock is before a start time of the second time-frequency resource block, the method in the base station for wireless communication includes:

receiving a first radio signal in the first time-frequency resource block.

Herein, the first bit subblock is used for generating the first radio signal.

According to one aspect of the disclosure, the above method is characterized in that: when an end time of time-frequency resources in the first time-frequency resource block assigned to the first bit subblock is before a start time of the second time-frequency resource block, the method in the base station for wireless communication includes:

giving up wireless receiving after the end time of the time-frequency resources in the first time-frequency resource block assigned to the first bit subblock.

According to one aspect of the disclosure, the above method is characterized in that: when an end time of time-frequency resources in the first time-frequency resource block assigned to the first bit subblock is before a start time of the second time-frequency resource block, the base station gives up wireless receiving after the end time of the time-frequency resources in the first time-frequency resource block assigned to the first bit subblock, and partial or all bits in the second bit subblock are used for generating the first radio signal; an end time of time-frequency resources in the first time-frequency resource block assigned to the partial or all bits in the second bit subblock is a second time, the end time of time-frequency resources in the first time-frequency resource block assigned to the first bit subblock is a first time, and the second time is not later than the first time.

According to one aspect of the disclosure, the above method is characterized in that: when an end time of time-frequency resources in the first time-frequency resource block assigned to the first bit subblock is before a start time of the second time-frequency resource block, the base station receives the first radio signal in the first time-frequency resource block; the first bit subblock is used for generating the first radio signal and partial or all bits in the second bit subblock are used for generating the first radio signal; and an end time of time-frequency resources in the first time-frequency resource block assigned to the partial or all bits in the second bit subblock is before the start time of the second time-frequency resource block.

According to one aspect of the disclosure, the above method includes:

determining that a first time window and a second time window are overlapping in time domain.

Herein, the first time window includes time-domain resources occupied by the first time-frequency resource block, and the second time window includes time-domain resources occupied by the second time-frequency resource block.

According to one aspect of the disclosure, the above method includes:

transmitting a third radio signal.

Herein, the first bit subblock is used for determining whether the third radio signal is correctly received According to one aspect of the disclosure, the above method includes:

transmitting a fourth radio signal.

Herein, the second bit block is used for determining whether the fourth radio signal is correctly received.

The disclosure provides a UE for wireless communication, wherein the UE includes:

a first receiver, to receive a first signaling, the first signaling indicating to transmit a first bit block in a first time-frequency resource block;

a second receiver, to receive a second signaling, the second signaling indicating to transmit a second bit block in a second time-frequency resource block; and a first transmitter, to transmit a second radio signal in the second time-frequency resource block.

Herein, an end time of the second time-frequency resource block is behind a start time of the first time-frequency resource block, and the second bit block is used for generating the second radio signal; the first bit block includes a first bit subblock and a second bit subblock; when an end time of time-frequency resources in the first time-frequency resource block assigned to the first bit subblock is behind a start time of the second time-frequency resource block, the first transmitter further gives up wireless transmission in the first time-frequency resource block, and the second bit block includes the first bit subblock; when an end time of time-frequency resources in the first time-frequency resource block assigned to the first bit subblock is before a start time of the second time-frequency resource block, the first transmitter further transmits a first radio signal in the first time-frequency resource block, and the first bit subblock is used for generating the first radio signal.

The disclosure provides a base station for wireless communication, wherein the base station includes:

a second transmitter, to transmit a first signaling, the first signaling indicating to receive a first bit block in a first time-frequency resource block;

a third transmitter, to transmit a second signaling, the second signaling indicating to receive a second bit block in a second time-frequency resource block; and a third receiver, to receive a second radio signal in the second time-frequency resource block.

Herein, an end time of the second time-frequency resource block is behind a start time of the first time-frequency resource block, and the second bit block is used for generating the second radio signal; the first bit block includes a first bit subblock and a second bit subblock; when an end time of time-frequency resources in the first time-frequency resource block assigned to the first bit subblock is behind a start time of the second time-frequency resource block, the third receiver gives up wireless receiving in the first time-frequency resource block, and the second bit block includes the first bit subblock; when an end time of time-frequency resources in the first time-frequency resource block assigned to the first bit subblock is before a start time of the second time-frequency resource block, the third receiver further receives a first radio signal in the first time-frequency resource block, and the first bit subblock is used for generating the first radio signal.

In one embodiment, compared with conventional schemes, the disclosure has the following benefits.

The transmission mode in the first time-frequency resource group is associated with the end time of time-frequency resources of the first bit subblock and the start time of the second time-frequency resource block, which determines more flexibly whether to keep the transmission in the first time-frequency resource block compared with the method in sTTI, thereby avoiding waste of resources.

When an end time of time-frequency resources in the first time-frequency resource block assigned to the first bit subblock is before a start time of the second time-frequency resource block, the UE will transmit out partial or all bits in the second bit subblock in the condition of guaranteeing no overlap with the transmission of the second radio signal in time domain, thereby improving spectrum efficiency without impacting UCI performances.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
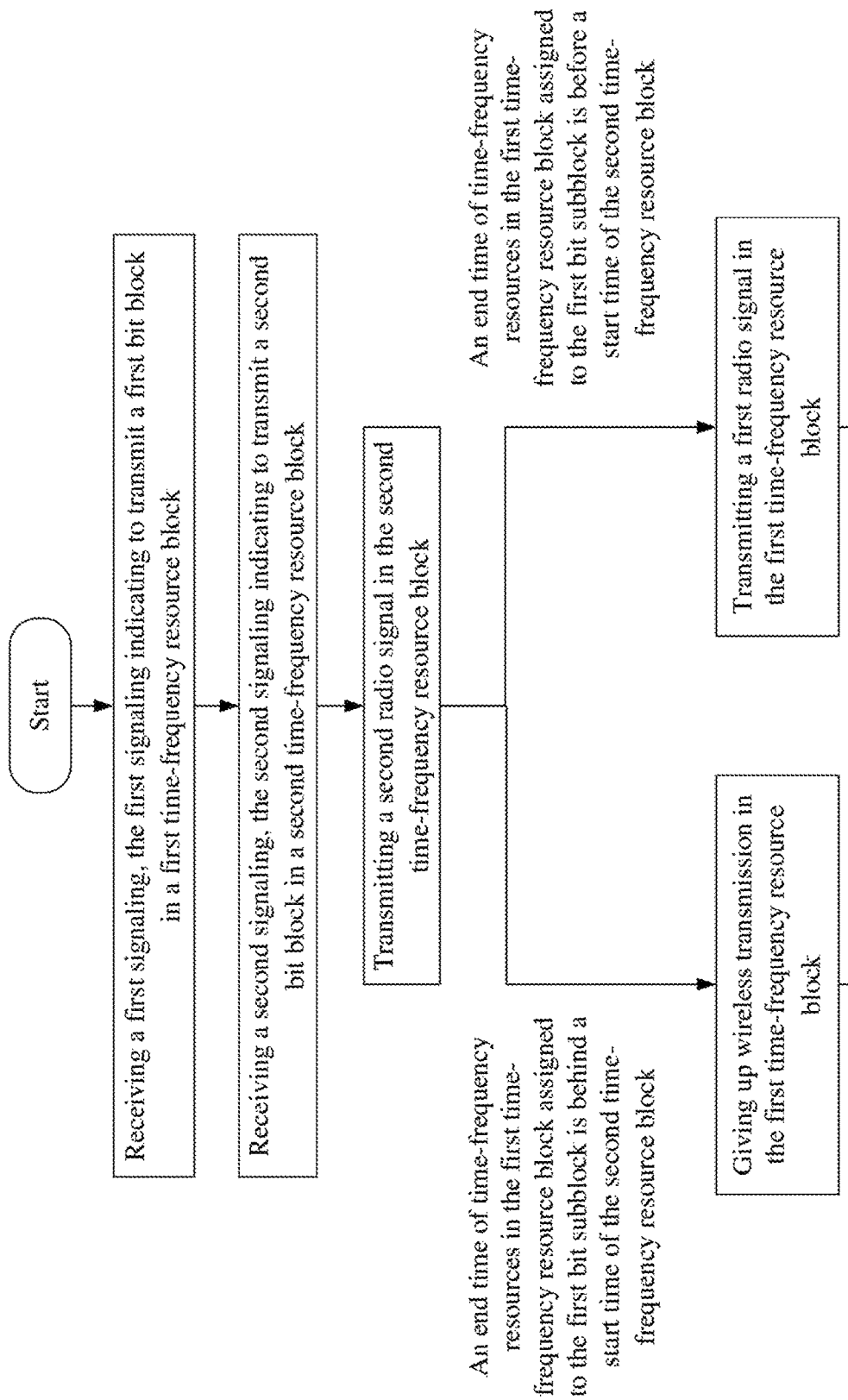
FIG. 1 is a flowchart of a first signaling according to one embodiment of the disclosure.

Embodiment 1 illustrates an example of a flowchart of a first signaling, as shown in FIG. 1.

In Embodiment 1, the UE in the disclosure first receives a first signaling, the first signaling indicating to transmit a first bit block in a first time-frequency resource block, then receives a second signaling, the second signaling indicating to transmit a second bit block in a second time-frequency resource block, and finally transmits a second radio signal in the second time-frequency resource block; an end time of the second time-frequency resource block is behind a start time of the first time-frequency resource block, and the second bit block is used for generating the second radio signal; the first bit block includes a first bit subblock and a second bit subblock; when an end time of time-frequency resources in the first time-frequency resource block assigned to the first bit subblock is behind a start time of the second time-frequency resource block, the UE gives up wireless transmission in the first time-frequency resource block and the second bit block includes the first bit subblock; when an end time of time-frequency resources in the first time-frequency resource block assigned to the first bit subblock is before a start time of the second time-frequency resource block, the UE transmits a first radio signal in the first time-frequency resource block and the first bit subblock is used for generating the first radio signal.

In one embodiment, the phrase that giving up wireless transmission in the first time-frequency resource block includes: keeping zero transmit power in the first time-frequency resource block.

In one embodiment, the phrase that giving up wireless transmission in the first time-frequency resource block includes: buffering the second bit subblock to wait for a next transmission opportunity.

In one embodiment, the first radio signal occupies time-domain resources from the start time of the first time-frequency resource block to the start time of the second time-frequency resource block.

In one embodiment, when an end time of time-frequency resources in the first time-frequency resource block assigned to the first bit subblock is before a start time of the second time-frequency resource block, the UE transmits the first radio signal in the first time-frequency resource block, the first bit subblock is used for generating the first radio signal, and partial or all bits in the second bit subblock are used for generating the first radio signal.

In one subembodiment, the partial bits in the second bit subblock are those bits in the second bit subblock for which an end time of assigned time-frequency resources is before the start time of the second time-frequency resource block.

In one affiliated embodiment of the above subembodiment, the first radio signal is obtained after the first bit subblock and the partial or all bits in the second bit subblock are processed in sequence through rate matching, scrambling, modulation, layer mapping, transform precoding, multi-antenna precoding, resource mapping, and physical antenna mapping.

In one affiliated embodiment of the above subembodiment, the first radio signal is obtained after the first bit subblock and the partial or all bits in the second bit subblock are processed through rate matching, scrambling, modulation, layer mapping, transform precoding, multi-antenna precoding, resource mapping, and physical antenna mapping.

In one embodiment, the UE transmits the first radio signal in the first time-frequency resource block, the first bit subblock is used for generating the first radio signal, and the second bit block does not include the first bit subblock.

In one subembodiment, the first radio signal is obtained after partial or all bits in the first bit block are processed in sequence through rate matching, scrambling, modulation, layer mapping, transform precoding, multi-antenna precoding, resource mapping, and physical antenna mapping.

In one subembodiment, the first radio signal is obtained after partial or all bits in the first bit block are processed through rate matching, scrambling, modulation, layer mapping, transform precoding, multi-antenna precoding, resource mapping, and physical antenna mapping.

In one embodiment, the multicarrier symbol in the disclosure is a Single-Carrier Frequency Division Multiple Access (SC-FDMA) symbol.

In one embodiment, the multicarrier symbol in the disclosure is a Filter Bank Multi Carrier (FBMC) symbol.

In one embodiment, the multicarrier symbol in the disclosure is an OFDM symbol including a Cyclic Prefix (CP).

In one embodiment, the multicarrier symbol in the disclosure is a (Discrete Fourier Transform Spreading Orthogonal Frequency Division Multiplexing (DFT-s-OFDM) symbol including a Cyclic Prefix (CP).

In one embodiment, the multicarrier symbol in the disclosure is a Discrete Fourier Transform Spreading Frequency Division Multiple Access (DFT-S-FDMA) symbol.

In one embodiment, the first bit block and the second bit block include multiple bits respectively.

In one embodiment, the first bit subblock and the second bit subblock include a positive integer number of bits respectively.

In one embodiment, the first time-frequency resource block is reserved to a Physical Uplink Shared Channel (PUSCH).

In one embodiment, the first time-frequency resource block is reserved for transmission of an eMBB Uplink Shared Channel (UL-SCH).

In one embodiment, the first time-frequency resource block is reserved for transmission of eMBB uplink data channel and uplink control channel.

In one embodiment, the second time-frequency resource block is reserved to a Physical Uplink Control Channel (PUCCH).

In one embodiment, the second time-frequency resource block is reserved to a Short Latency Physical Uplink Control Channel (sPUCCH).

In one embodiment, the second time-frequency resource block is reserved for transmission of a URLLC uplink control channel.

In one embodiment, the second time-frequency resource block is reserved for transmission of URLLC uplink control channel and uplink data channel.

In one subembodiment, the first bit subblock is a UCI and the second bit subblock is data.

In one subembodiment, the data corresponds to a UL-SCH.

In one embodiment, the second bit block is a UCI.

In one embodiment, the first time-frequency resource block occupies a positive integer number of multicarrier symbols in time domain, and the first time-frequency resource block occupies a positive integer number of sub-carriers in frequency domain.

In one embodiment, the second time-frequency resource block occupies a positive integer number of multicarrier symbols in time domain, and the second time-frequency resource block occupies a positive integer number of sub-carriers in frequency domain.

Embodiment 2

Figure 2:
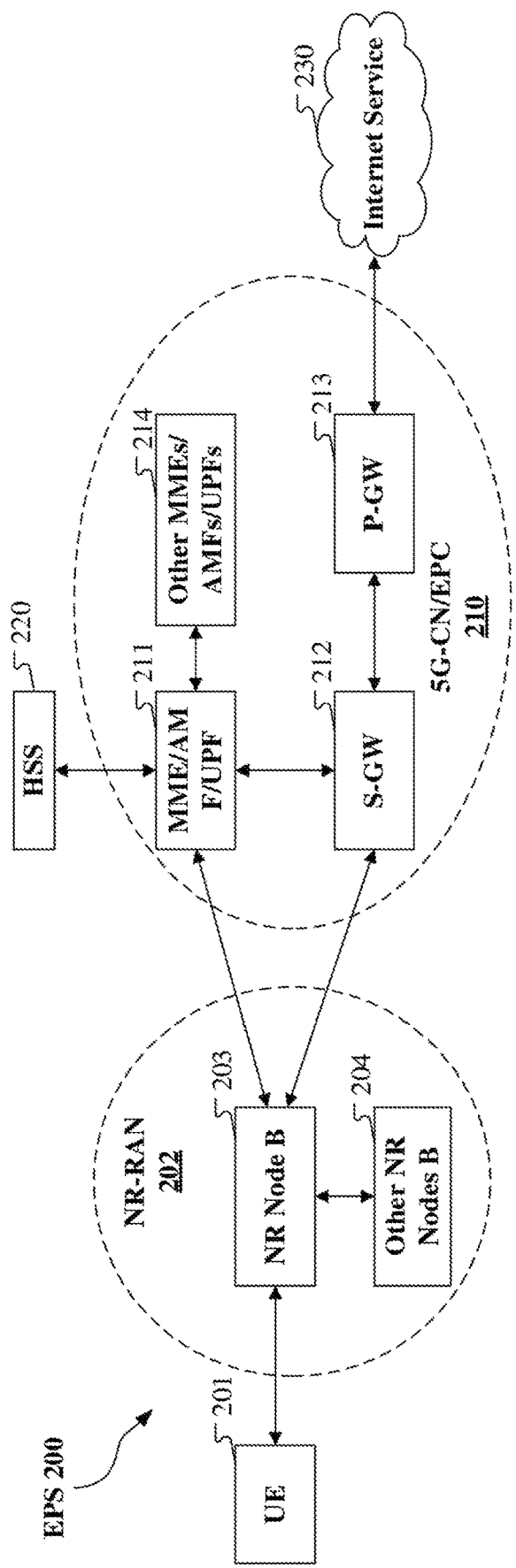
FIG. 2 is a diagram illustrating a network architecture according to one embodiment of the disclosure.

Embodiment 2 illustrates an example of a diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-terrestrial base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the UE in the disclosure.

In one embodiment, the gNB 203 corresponds to the base station in the disclosure.

In one embodiment, a radio link between the UE 201 and the gNB 203 is a cellular link.

In one embodiment, the UE 201 supports simultaneous wireless transmission of eMBB and URLLC.

In one embodiment, the gNB 203 supports simultaneous wireless transmission of eMBB and URLLC.

In one embodiment, the UE 201 supports transmission of multiple UCIs in one time unit, the time unit is a subframe or the time unit is a timeslot.

In one embodiment, the gNB 203 supports reception of multiple UCIs coming from one UE in one time unit, the time unit is a subframe or the time unit is a timeslot.

Embodiment 3

Figure 3:
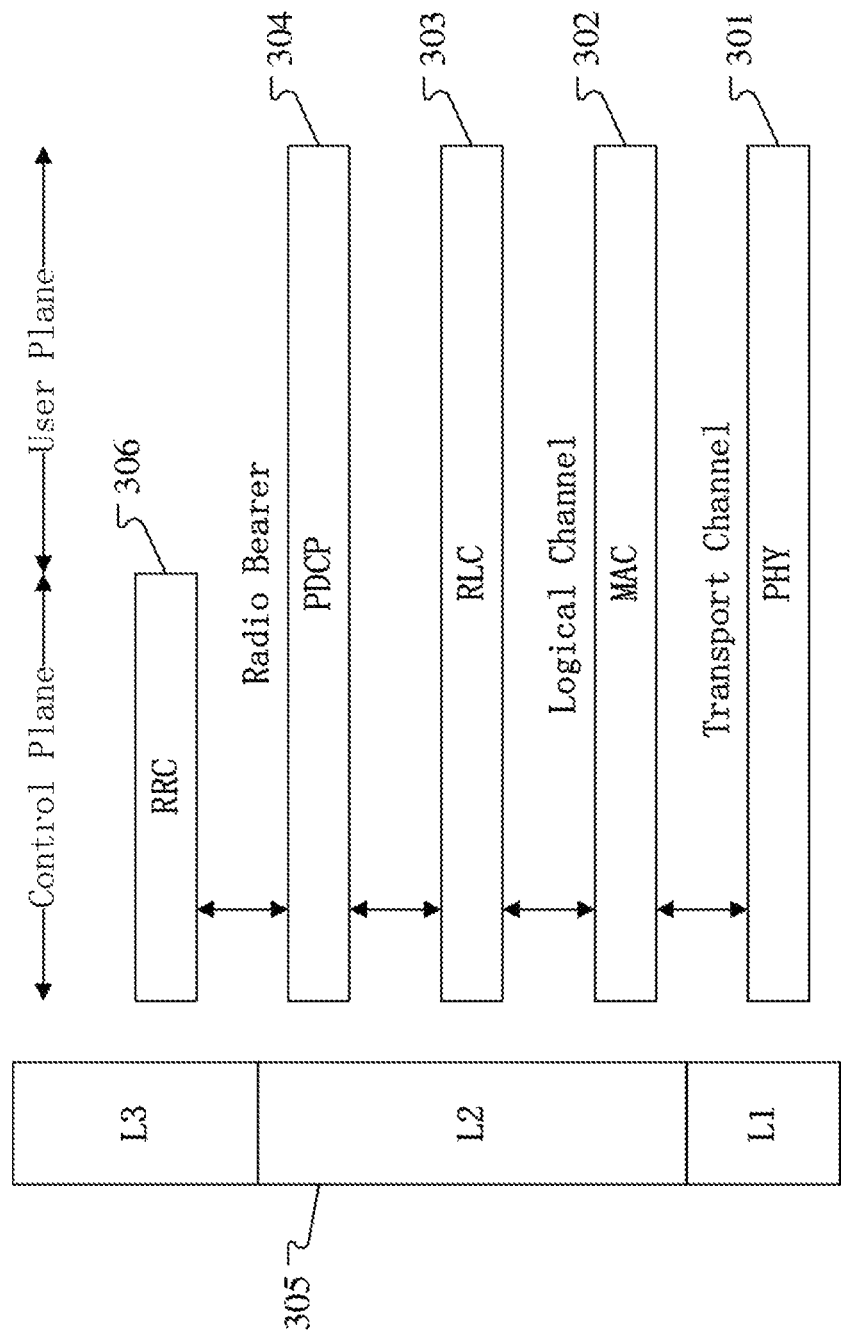
FIG. 3 is a diagram illustrating an embodiment of a radio protocol architecture of a user plane and a control plane according to one embodiment of the disclosure.

FIG. 3 illustrates a diagram of an embodiment of a radio protocol architecture of a user plane and a control plane, as shown in FIG. 3.

FIG. 3 is a diagram of an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the UE in the disclosure.

In one embodiment, the radio protocol architecture shown in FIG. 3 is applicable to the base station in the disclosure.

In one embodiment, the first signaling in the disclosure is generated on the PHY 301.

In one embodiment, the second signaling in the disclosure is generated on the PHY 301.

In one embodiment, the first radio signal in the disclosure is generated on the PHY 301.

In one embodiment, the second radio signal in the disclosure is generated on the PHY 301.

In one embodiment, the first radio signal in the disclosure is generated on the MAC sublayer 302.

In one embodiment, the second radio signal in the disclosure is generated on the MAC sublayer 302.

In one embodiment, the third radio signal in the disclosure is generated on the MAC sublayer 302.

In one embodiment, the fourth radio signal in the disclosure is generated on the MAC sublayer 302.

Embodiment 4

Figure 4:
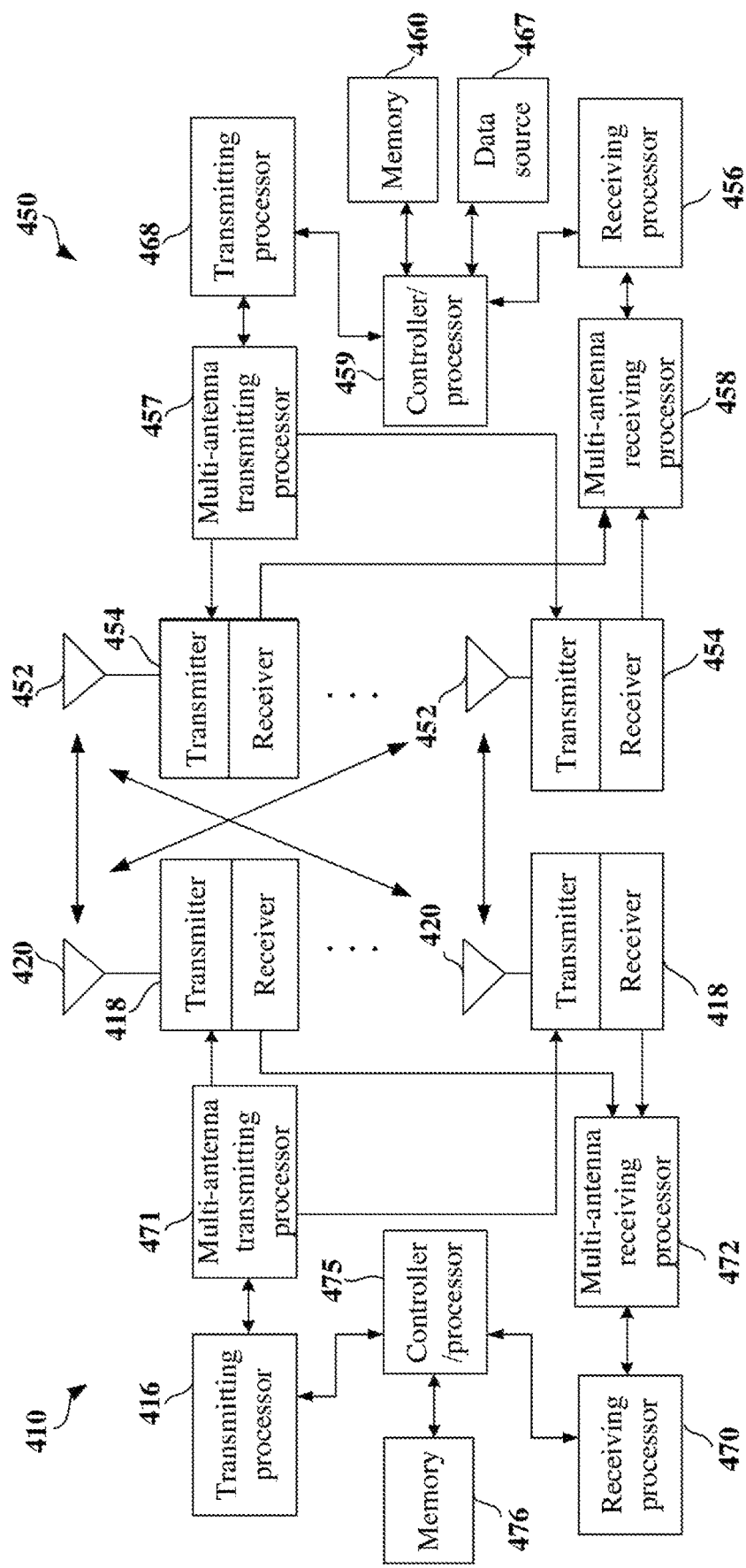
FIG. 4 is a diagram illustrating a UE and a base station according to one embodiment of the disclosure.

Embodiment 4 illustrates a diagram of a UE and a base station according to the disclosure, as shown in FIG. 4. FIG. 4 is a block diagram of a UE 450 and a base station 410 that are in communication with each other in an access network.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The base station 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the base station 410 to the UE 450, at the base station 410, a higher-layer packet from a core network is provided to the controller/processor 475. The controller/processor 475 provides functions of Layer 2. In a transmission from the base station 410 to the UE 450, the controller/processor 475 provides header compression, encryption, packet segmentation and reordering, multiplexing between a logical channel and a transport channel, and a radio resource allocation for the UE 450 based on various priority metrics. The controller/processor 475 is also in charge of retransmission of lost packets, and signalings to the UE 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the UE 450 side and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to different antennas 420.

In a transmission from the base station 410 to the UE 450, at the UE 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 by a receiving analog precoding/beamforming operation. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the base station 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In a transmission from the base station 410 to the UE 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the UE 450 to the base station 410, at the UE 450, the data source 467 provides a higher-layer packet to the controller/processor 459. The data source 467 illustrates all protocol layers above the L2 layer. Similar as the transmitting function of the base station 410 described in the transmission from the base station 410 to the UE 450, the controller/processor 459 provides header compression, encryption, packet segmentation and reordering, and multiplexing between a logical channel and a transport channel based on the radio resource allocation of the base station 410 so as to provide the functions of Layer 2 used for the control plane and user plane. The controller/processor 459 is also in charge of retransmission of lost packets, and signalings to the base station 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the UE 450 to the base station 410, the function of the base station 410 is similar as the receiving function of the UE 450 described in the transmission from the base station 410 to the UE 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In a transmission from the UE 450 to the base station 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the UE 450 includes at least one processor and at least one memory. The at least one memory includes computer program codes. The at least one memory and the computer program codes are configured to be used in collaboration with the at least one processor. The UE 450 at least first receives a first signaling, the first signaling indicating to transmit a first bit block in a first time-frequency resource block, then receives a second signaling, the second signaling indicating to transmit a second bit block in a second time-frequency resource block, and finally transmits a second radio signal in the second time-frequency resource block; an end time of the second time-frequency resource block is behind a start time of the first time-frequency resource block, and the second bit block is used for generating the second radio signal; the first bit block includes a first bit subblock and a second bit subblock; when an end time of time-frequency resources in the first time-frequency resource block assigned to the first bit subblock is behind a start time of the second time-frequency resource block, the UE 450 gives up wireless transmission in the first time-frequency resource block, and the second bit block includes the first bit subblock; when an end time of time-frequency resources in the first time-frequency resource block assigned to the first bit subblock is before a start time of the second time-frequency resource block, the UE 450 transmits a first radio signal in the first time-frequency resource block, and the first bit subblock is used for generating the first radio signal.

In one embodiment, the UE 450 includes a memory that stores a computer readable instruction program. The computer readable instruction program generates an action when executed by at least one processor. The action includes: receiving a first signaling, the first signaling indicating to transmit a first bit block in a first time-frequency resource block, then receiving a second signaling, the second signaling indicating to transmit a second bit block in a second time-frequency resource block, and finally transmitting a second radio signal in the second time-frequency resource block; an end time of the second time-frequency resource block is behind a start time of the first time-frequency resource block, and the second bit block is used for generating the second radio signal; the first bit block includes a first bit subblock and a second bit subblock; when an end time of time-frequency resources in the first time-frequency resource block assigned to the first bit subblock is behind a start time of the second time-frequency resource block, the UE 450 gives up wireless transmission in the first time-frequency resource block, and the second bit block includes the first bit subblock; when an end time of time-frequency resources in the first time-frequency resource block assigned to the first bit subblock is before a start time of the second time-frequency resource block, the UE 450 transmits a first radio signal in the first time-frequency resource block, and the first bit subblock is used for generating the first radio signal.

In one subembodiment, the base station 410 includes at least one processor and at least one memory. The at least one memory includes computer program codes. The at least one memory and the computer program codes are configured to be used in collaboration with the at least one processor. The base station 410 at least first transmits a first signaling, the first signaling indicating to receive a first bit block in a first time-frequency resource block, then transmits a second signaling, the second signaling indicating to receive a second bit block in a second time-frequency resource block, and finally receives a second radio signal in the second time-frequency resource block; an end time of the second time-frequency resource block is behind a start time of the first time-frequency resource block, and the second bit block is used for generating the second radio signal; the first bit block includes a first bit subblock and a second bit subblock; when an end time of time-frequency resources in the first time-frequency resource block assigned to the first bit subblock is behind a start time of the second time-frequency resource block, the base station 410 gives up wireless receiving in the first time-frequency resource block, and the second bit block includes the first bit subblock; when an end time of time-frequency resources in the first time-frequency resource block assigned to the first bit subblock is before a start time of the second time-frequency resource block, the base station 410 receives a first radio signal in the first time-frequency resource block, and the first bit subblock is used for generating the first radio signal.

In one subembodiment, the base station 410 includes a memory that stores a computer readable instruction program. The computer readable instruction program generates an action when executed by at least one processor. The action includes: first transmitting a first signaling, the first signaling indicating to receive a first bit block in a first time-frequency resource block, then transmitting a second signaling, the second signaling indicating to receive a second bit block in a second time-frequency resource block, and finally receiving a second radio signal in the second time-frequency resource block; an end time of the second time-frequency resource block is behind a start time of the first time-frequency resource block, and the second bit block is used for generating the second radio signal; the first bit block includes a first bit subblock and a second bit subblock; when an end time of time-frequency resources in the first time-frequency resource block assigned to the first bit subblock is behind a start time of the second time-frequency resource block, the base station 410 gives up wireless receiving in the first time-frequency resource block, and the second bit block includes the first bit subblock; when an end time of time-frequency resources in the first time-frequency resource block assigned to the first bit subblock is before a start time of the second time-frequency resource block, the base station 410 receives a first radio signal in the first time-frequency resource block, and the first bit subblock is used for generating the first radio signal.

In one embodiment, the UE 450 corresponds to the UE in the disclosure.

In one embodiment, the base station 410 corresponds to the base station in the disclosure.

In one embodiment, at least one of the antenna 452, the receiver 454, the multi-antenna receiving processor 458 and the receiving processor 456 is used for receiving a first signaling; and at least one of the antenna 420, the transmitter 418, the multi-antenna transmitting processor 471 and the transmitting processor 416 is used for transmitting a first signaling.

In one embodiment, at least one of the antenna 452, the receiver 454, the multi-antenna receiving processor 458 and the receiving processor 456 is used for receiving a second signaling; and at least one of the antenna 420, the transmitter 418, the multi-antenna transmitting processor 471 and the transmitting processor 416 is used for transmitting a second signaling.

In one embodiment, at least one of the antenna 452, the transmitter 454, the multi-antenna transmitting processor 457 and the transmitting processor 468 is used for transmitting a second radio signal in a second time-frequency resource block; and at least one of the antenna 420, the receiver 418, the multi-antenna receiving processor 472 and the receiving processor 470 is used for receiving a second radio signal in a second time-frequency resource block.

In one embodiment, at least one of the antenna 452, the transmitter 454, the multi-antenna transmitting processor 457, the transmitting processor 468 and the controller/processor 459 is used for determining to give up wireless transmission in the first time-frequency resource block; and at least one of the antenna 420, the receiver 418, the multi-antenna receiving processor 472, the receiving processor 470 and the controller/processor 475 is used for determining to give up wireless receiving in the first time-frequency resource block.

In one embodiment, at least one of the antenna 452, the transmitter 454, the multi-antenna transmitting processor 457 and the transmitting processor 468 is used for transmitting a first radio signal in the first time-frequency resource block; and at least one of the antenna 420, the receiver 418, the multi-antenna receiving processor 472 and the receiving processor 470 is used for receiving a first radio signal in the first time-frequency resource block.

In one embodiment, when an end time of time-frequency resources in the first time-frequency resource block assigned to the first bit subblock is before a start time of the second time-frequency resource block, at least one of the antenna 452, the transmitter 454, the multi-antenna transmitting processor 457, the transmitting processor 468 and the controller/processor 459 is used for giving up wireless transmission after the end time of the time-frequency resources in the first time-frequency resource block assigned to the first bit subblock; and at least one of the antenna 420, the receiver 418, the multi-antenna receiving processor 472, the receiving processor 470 and the controller/processor 475 is used for giving up wireless receiving after the end time of the time-frequency resources in the first time-frequency resource block assigned to the first bit subblock.

In one embodiment, at least one of the antenna 452, the transmitter 454, the multi-antenna transmitting processor 457, the transmitting processor 468 and the controller/processor 459 is used for determining that a first time window and a second time window are overlapping in time domain; and at least one of the antenna 420, the receiver 418, the multi-antenna receiving processor 472, the receiving processor 470 and the controller/processor 475 is used for determining that a first time window and a second time window are overlapping in time domain.

In one embodiment, at least one of the antenna 452, the receiver 454, the multi-antenna receiving processor 458 and the receiving processor 456 is used for receiving a third radio signal; and at least one of the antenna 420, the transmitter 418, the multi-antenna transmitting processor 471 and the transmitting processor 416 is used for transmitting a third radio signal.

In one embodiment, at least one of the antenna 452, the receiver 454, the multi-antenna receiving processor 458 and the receiving processor 456 is used for receiving a fourth radio signal; and at least one of the antenna 420, the transmitter 418, the multi-antenna transmitting processor 471 and the transmitting processor 416 is used for transmitting a fourth radio signal.

Embodiment 5

Figure 5:
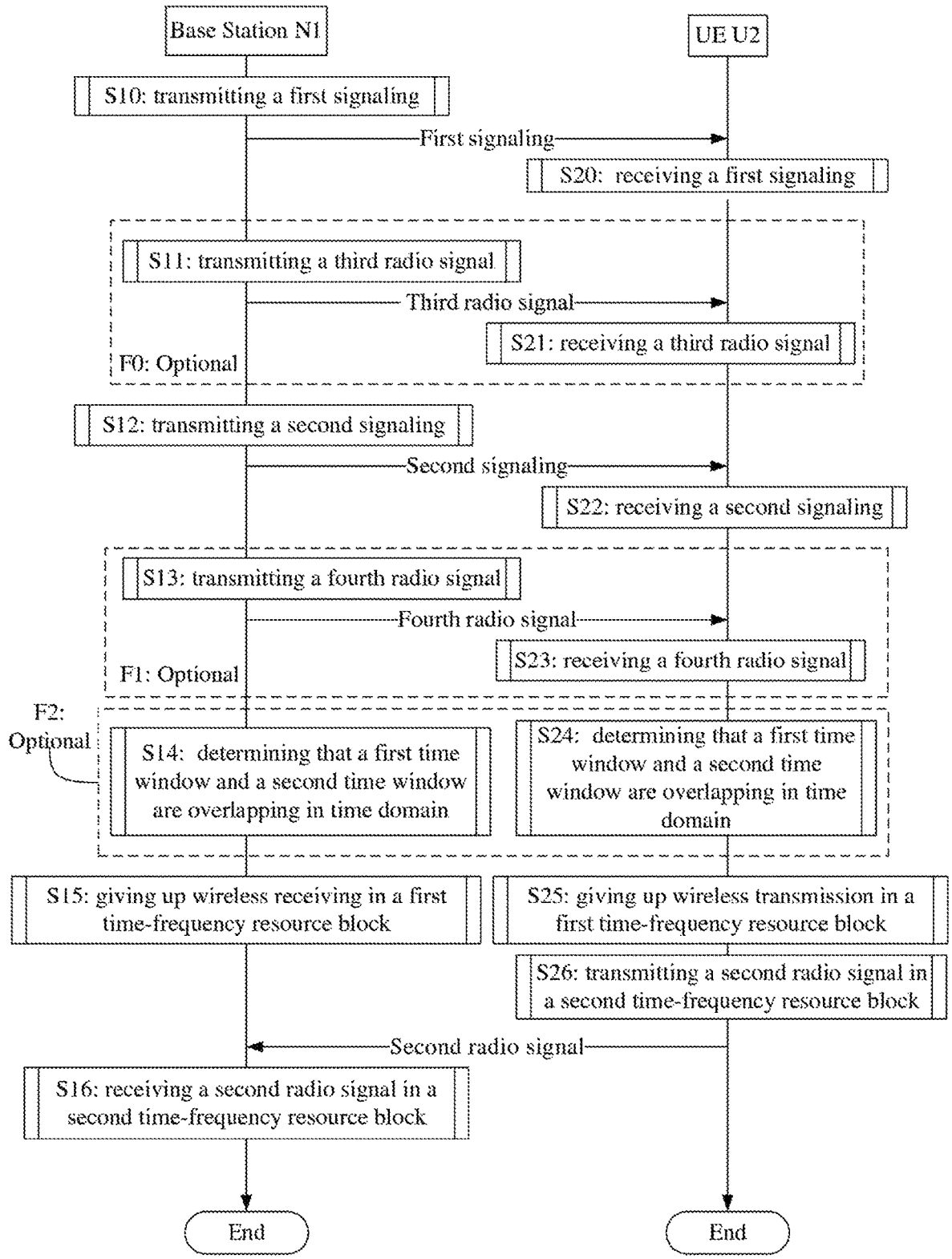
FIG. 5 is a flowchart of a second radio signal according to one embodiment of the disclosure.

Embodiment 5 illustrates an example of a flowchart of a second radio signal, as shown in FIG. 5. In FIG. 5, a UE U2 communicates with a base station N1 through a Uu link. Steps indicated by F0, F1 and F2 in FIG. 5 are optional.

The base station N1 transmits a first signaling in S10, the first signaling indicating to transmit a first bit block in a first time-frequency resource block; transmits a third radio signal in S11; transmits a second signaling in S12, the second signaling indicating to transmit a second bit block in a second time-frequency resource block; transmits a fourth radio signal in S13; determines that a first time window and a second time window are overlapping in time domain in S14; gives up wireless receiving in the first time-frequency resource block in S15; and receives a second radio signal in the second time-frequency resource block S16.

The UE U2 receives a first signaling in S20, the first signaling indicating to transmit a first bit block in a first time-frequency resource block; receives a third radio signal in S21; receives a second signaling in S12, the second signaling indicating to transmit a second bit block in a second time-frequency resource block; receives a fourth radio signal in S23; determines that a first time window and a second time window are overlapping in time domain in S24; gives up wireless transmission in the first time-frequency resource block in S25; and transmits a second radio signal in the second time-frequency resource block S26.

In Embodiment 5, an end time of the second time-frequency resource block is behind a start time of the first time-frequency resource block, and the second bit block is used for generating the second radio signal; the first bit block includes a first bit subblock and a second bit subblock; an end time of time-frequency resources in the first time-frequency resource block assigned to the first bit subblock is behind a start time of the second time-frequency resource block; the first time window includes time-domain resources occupied by the first time-frequency resource block, and the second time window includes time-domain resources occupied by the second time-frequency resource block; the first bit subblock is used for determining whether the third radio signal is correctly received; and the second bit block is used for determining whether the fourth radio signal is correctly received.

In one embodiment, multicarrier symbols occupied by the first time window are the same as multicarrier symbols occupied by the first time-frequency resource block.

In one embodiment, multicarrier symbols occupied by the second time window are the same as multicarrier symbols occupied by the second time-frequency resource block.

In one embodiment, the first time window is a slot for eMBB.

In one embodiment, the second time window is a slot for URLLC.

In one embodiment, the second time window is a mini slot for URLLC.

In one embodiment, a subcarrier spacing corresponding to the first radio signal is a first subcarrier spacing, a subcarrier spacing corresponding to the second radio signal is a second subcarrier spacing, and the second subcarrier spacing is greater than the first subcarrier spacing.

In one embodiment, the UE U2 determines according to the first signaling and the second signaling that the first time window and the second time window are overlapping in time domain.

In one embodiment, the phrase that the first time window and the second time window are overlapping in time domain means that: there is at least one given multicarrier symbol, and the first time window and the second time window both include the given multicarrier symbol.

In one embodiment, the phrase that the first time window and the second time window are overlapping in time domain means that: a start time of the second time window is earlier than an end time of the first time window.

In one embodiment, the phrase that the first time window and the second time window are overlapping in time domain means that: an end time of the second time window is earlier than a start time of the first time window.

In one embodiment, frequency-domain resources occupied by the first time-frequency resource block and frequency-domain resources occupied by the second time-frequency resource block both belong to one same Bandwidth Part (BWP), or frequency-domain resources occupied by the first time-frequency resource block and frequency-domain resources occupied by the second time-frequency resource block both belong to one same carrier.

In one embodiment, frequency-domain resources occupied by the first time-frequency resource block and frequency-domain resources occupied by the second time-frequency resource block belong to different BWPs respectively, or frequency-domain resources occupied by the first time-frequency resource block and frequency-domain resources occupied by the second time-frequency resource block belong to different carriers respectively.

In one embodiment, the first signaling includes configuration information for the third radio signal, and the configuration information includes one or more of occupied time-domain resources, occupied frequency-domain resources, a Modulation and Coding Status (MCS), a Redundancy Version (RV), a New Data Indicator (NDI) and a HARQ process number.

In one embodiment, the first signaling is one piece of Downlink Control Information (DCI).

In one embodiment, the first signaling is one DL grant.

In one embodiment, a physical layer channel occupied by the first signaling is a Physical Downlink Control Channel (PDCCH).

In one embodiment, the first signaling is DL grant for eMBB.

In one embodiment, a physical layer channel occupied by the third radio signal is a Physical Downlink Shared Channel (PDSCH).

In one embodiment, a transmission channel occupied by the third radio signal is a Downlink Shared Channel (DL-SCH).

In one embodiment, the first bit subblock includes K1 bit(s), and the K1 bit(s) is(are) used for indicating whether the third radio signal is correctly received, the K1 being a positive integer.

In one subembodiment, the K1 is equal to 1.

In one subembodiment, the first bit subblock further includes K2 bit(s) besides the K1 bit(s), and the K2 bit(s) is(are) used for determining whether one or more radio signals other than the third radio signal are correctly received, the K2 being a positive integer.

In one embodiment, the second signaling includes configuration information for the fourth radio signal, and the configuration information includes one or more of occupied time-domain resources, occupied frequency-domain resources, an MCS, a RV, an NDI and a HARQ process number.

In one embodiment, the second signaling is one DCI.

In one embodiment, the second signaling is one DL grant.

In one embodiment, a physical layer channel occupied by the second signaling is a PDCCH, or a physical layer channel occupied by the second signaling is a Short Latency PDCCH (sPDCCH).

In one embodiment, the second signaling is a DL grant for URLLC.

In one embodiment, a physical layer channel occupied by the fourth radio signal is a PDSCH, or a physical layer channel occupied by the fourth radio signal is a Short Latency PDSCH (sPDSCH).

In one embodiment, a transmission channel occupied by the fourth radio signal is a DL-SCH.

In one embodiment, the second bit block includes K3 bit(s), and the K3 bit(s) is(are) used for indicating whether the fourth radio signal is correctly received, the K3 being a positive integer.

In one subembodiment, the K3 is equal to 1.

In one subembodiment, the second bit block further includes K4 bit(s) besides the K3 bit(s), and the K4 bit(s) is(are) used for determining whether one or more radio signals other than the fourth radio signal are correctly received, the K4 being a positive integer.

In one embodiment, the phrase that giving up wireless receiving in the first time-frequency resource block includes: performing no detection of signal in the first time-frequency resource block.

In one embodiment, the phrase that giving up wireless receiving in the first time-frequency resource block includes: for a signal in the first time-frequency resource block, performing no detection of the first bit block.

In one embodiment, a transmission start time of the first signaling is earlier than a transmission start time of the second signaling.

In one embodiment, a transmission end time of the first signaling is earlier than a transmission end time of the second signaling.

In one embodiment, the base station N1 determines according to the first signaling and the second signaling that the first time window and the second time window are overlapping in time domain.

Embodiment 6

Figure 6:
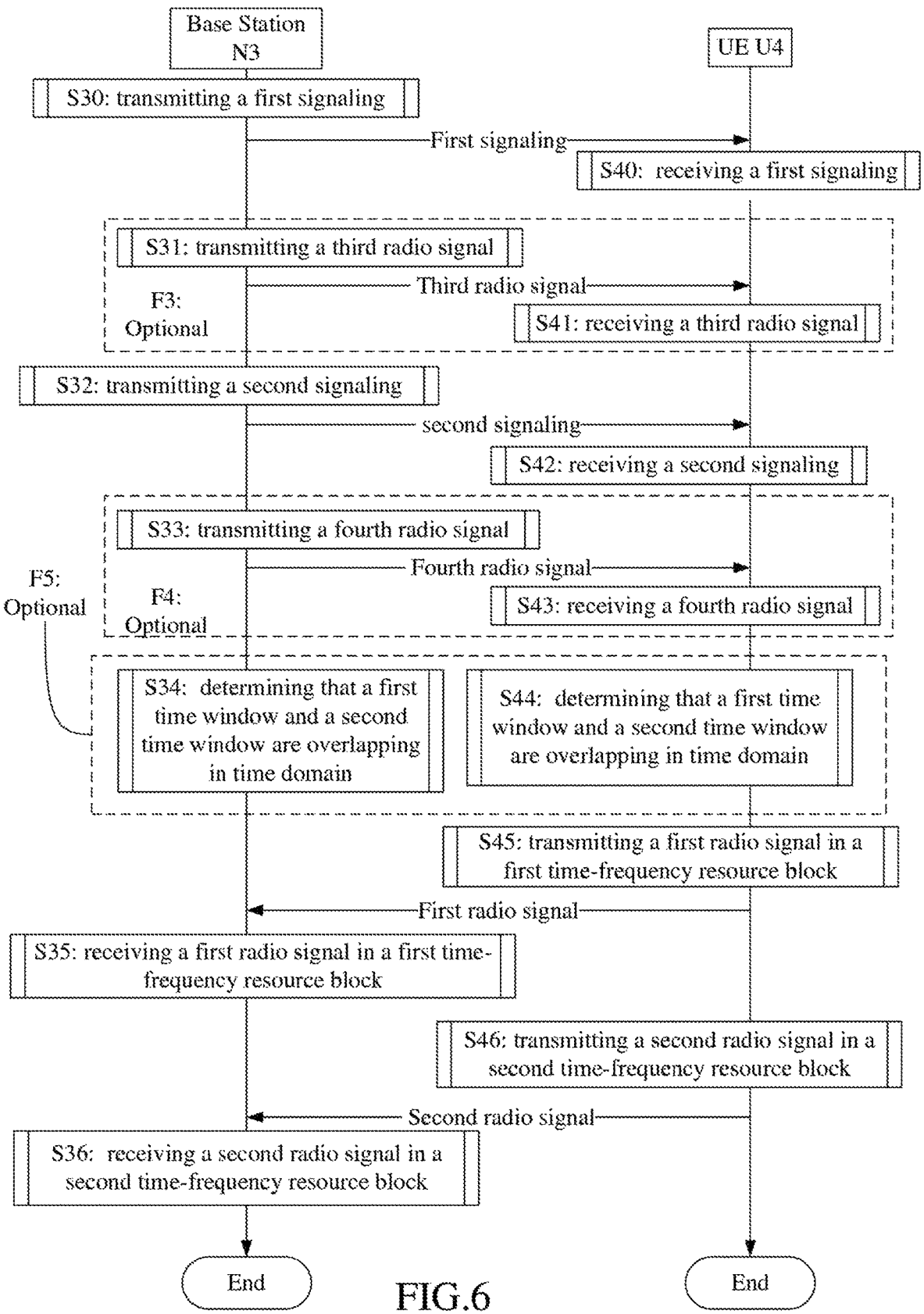
FIG. 6 is a flowchart of a second radio signal according to another embodiment of the disclosure.

Embodiment 6 illustrates an example of another flowchart of a second radio signal, as shown in FIG. 6. In FIG. 6, a UE U4 communicates with a base station N3 through a Uu link. Steps indicated by F3, F4 and F5 in FIG. 6 are optional. Embodiments and subembodiments in Embodiment 5 all are applicable to Embodiment 6 if no conflict is incurred.

The base station N3 transmits a first signaling in S30, the first signaling indicating to transmit a first bit block in a first time-frequency resource block; transmits a third radio signal in S31; transmits a second signaling in S32, the second signaling indicating to transmit a second bit block in a second time-frequency resource block; transmits a fourth radio signal in S33; determines that a first time window and a second time window are overlapping in time domain in S34; receives a first radio signal in the first time-frequency resource block in S35; and receives a second radio signal in the second time-frequency resource block in S36.

The UE U2 receives a first signaling in S40, the first signaling indicating to transmit a first bit block in a first time-frequency resource block; receives a third radio signal in S41; receives a second signaling in S42, the second signaling indicating to transmit a second bit block in a second time-frequency resource block; receives a fourth radio signal in S43; determines that a first time window and a second time window are overlapping in time domain in S44; transmits a first radio signal in the first time-frequency resource block in S45; and transmits a second radio signal in the second time-frequency resource block in S46.

In Embodiment 6, an end time of the second time-frequency resource block is behind a start time of the first time-frequency resource block, and the second bit block is used for generating the second radio signal; the first bit subblock is used for generating the first radio signal; an end time of time-frequency resources in the first time-frequency resource block assigned to the first bit subblock is before a start time of the second time-frequency resource block; the first time window includes time-domain resources occupied by the first time-frequency resource block, and the second time window includes time-domain resources occupied by the second time-frequency resource block; the first bit subblock is used for determining whether the third radio signal is correctly received; and the second bit block is used for determining whether the fourth radio signal is correctly received.

Embodiment 7

Figure 7:
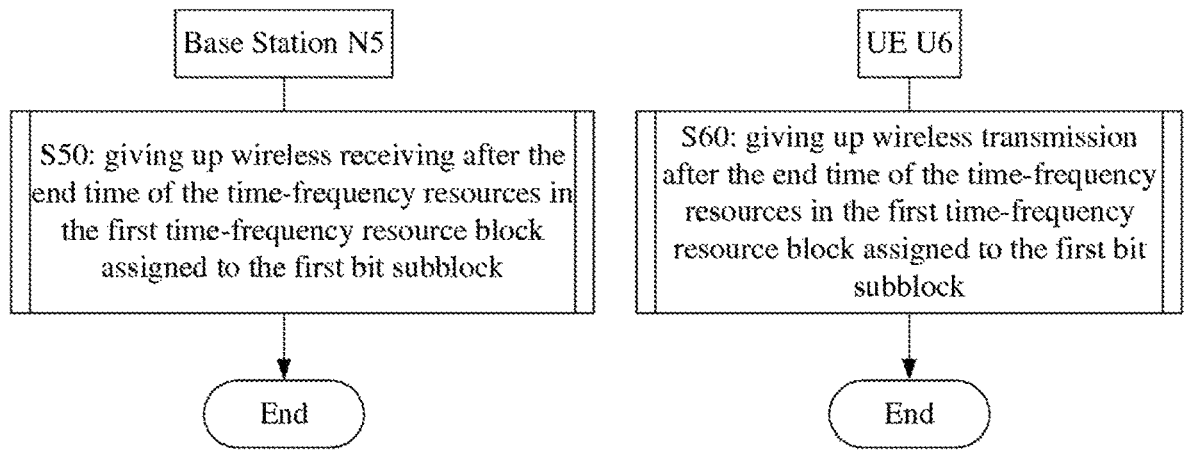
FIG. 7 is a flowchart of operation of the first time-frequency resource block according to the disclosure.

Embodiment 7 illustrates an example of a flowchart of operation of the first time-frequency resource block, as shown in FIG. 7. In FIG. 7, an end time of time-frequency resources in the first time-frequency resource block assigned to the first bit subblock is before a start time of the second time-frequency resource block, and a base station N5 and a UE U6 perform the following steps.

In S50, the base station N5 gives up wireless receiving after the end time of the time-frequency resources in the first time-frequency resource block assigned to the first bit subblock.

In S60, the UE U6 gives up wireless transmission after the end time of the time-frequency resources in the first time-frequency resource block assigned to the first bit subblock.

In one embodiment, the S50 in Embodiment 7 is an operation of the base station after the S36 in Embodiment 6.

In one embodiment, the S60 in Embodiment 7 is an operation of the UE after the S46 in Embodiment 6.

In one embodiment, the first radio signal occupies time-domain resources from a start time of the first time-frequency resource block to the end time of the time-frequency resources in the first time-frequency resource block assigned to the first bit subblock.

In one embodiment, the first radio signal occupies multicarrier symbols from a start time of the first time-frequency resource block to the end time of the time-frequency resources in the first time-frequency resource block assigned to the first bit subblock.

In one embodiment, the first radio signal is obtained by puncturing a target radio signal.

In one subembodiment, the target radio signal is obtained after partial or all bits included in the first bit block are processed in sequence through rate matching, scrambling, modulation, layer mapping, transform precoding, multi-antenna precoding, resource mapping and physical antenna mapping.

In one subembodiment, the target radio signal is obtained after partial or all bits included in the first bit block are processed through rate matching, scrambling, modulation, layer mapping, transform precoding, multi-antenna precoding, resource mapping and physical antenna mapping.

In one subembodiment, a given bit group and the first bit subblock both are used for generating the first radio signal, and bits included in the given bit group are those bits in the second bit subblock that are mapped to the same multicarrier symbols as the first bit subblock.

Embodiment 8

Figure 8:
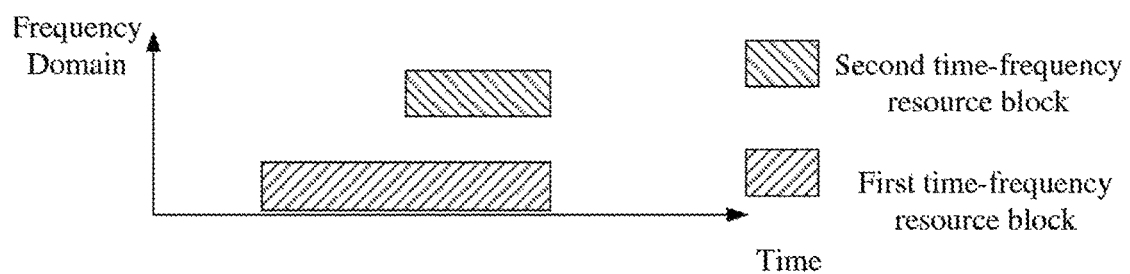
FIG. 8 is a diagram illustrating a first time-frequency resource block and a second time-frequency resource block according to the disclosure.

Embodiment 8 illustrates an example of a diagram of a first time-frequency resource block and a second time-frequency resource block, as shown in FIG. 8. In FIG. 8, time-domain resources occupied by the first time-frequency resource block are overlapping with time-domain resources occupied by the second time-frequency resource block.

In one embodiment, the phrase that time-domain resources occupied by the first time-frequency resource block are overlapping with time-domain resources occupied by the second time-frequency resource block means that: there is one multicarrier symbol which belongs to both the time-domain resources occupied by the first time-frequency resource block and the time-domain resources occupied by the second time-frequency resource block.

In one embodiment, frequency-domain resources occupied by the first time-frequency resource block include a positive integer number of subcarriers.

In one embodiment, time-domain resources occupied by the first time-frequency resource block include a positive integer number of multicarrier symbols.

In one embodiment, frequency-domain resources occupied by the second time-frequency resource block include a positive integer number of subcarriers.

In one embodiment, time-domain resources occupied by the second time-frequency resource block include a positive integer number of multicarrier symbols.

In one embodiment, frequency-domain resources occupied by the first time-frequency resource block include a positive integer number of Physical Resource Blocks (PRBs).

In one embodiment, frequency-domain resources occupied by the second time-frequency resource block include a positive integer number of PRBs.

Embodiment 9

Figure 9:
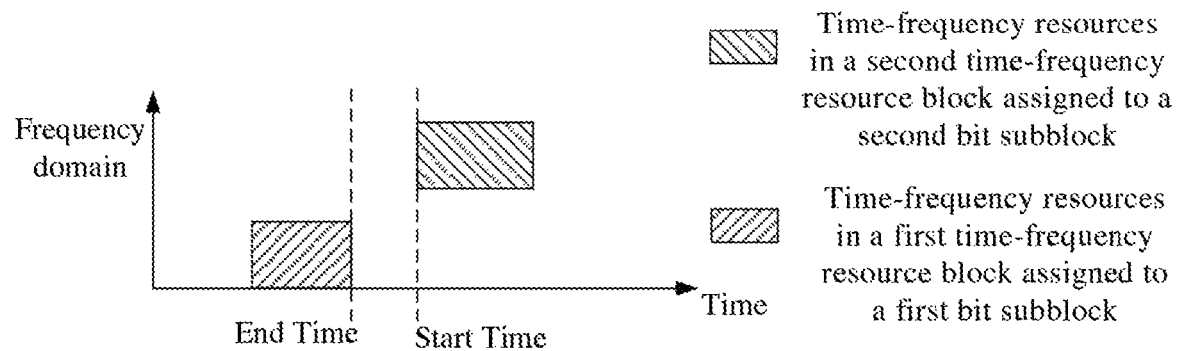
FIG. 9 is a diagram illustrating a first bit subblock and a second bit block according to the disclosure.

Embodiment 9 illustrates an example of a diagram of a first bit subblock and a second bit block, as shown in FIG. 9. In FIG. 9, an end time of time-frequency resources in the first time-frequency resource block assigned to the first bit subblock is before a start time of the second time-frequency resource block, the UE transmits a first radio signal in the first time-frequency resource block and the first bit subblock is used for generating the first radio signal.

Embodiment 10

Figure 10:
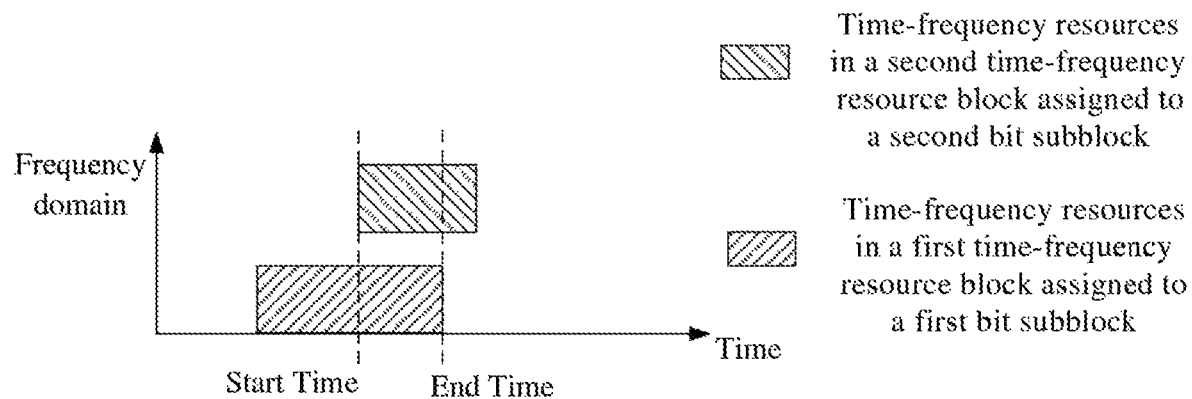
FIG. 10 is another diagram illustrating a first bit subblock and a second bit block according to the disclosure.

Embodiment 10 illustrates an example of another diagram of a first bit subblock and a second bit block, as shown in FIG. 10. In FIG. 10, an end time of time-frequency resources in the first time-frequency resource block assigned to the first bit subblock is behind a start time of the second time-frequency resource block, the UE gives up wireless transmission in the first time-frequency resource block and the second bit block includes the first bit subblock.

Embodiment 11

Figure 11:
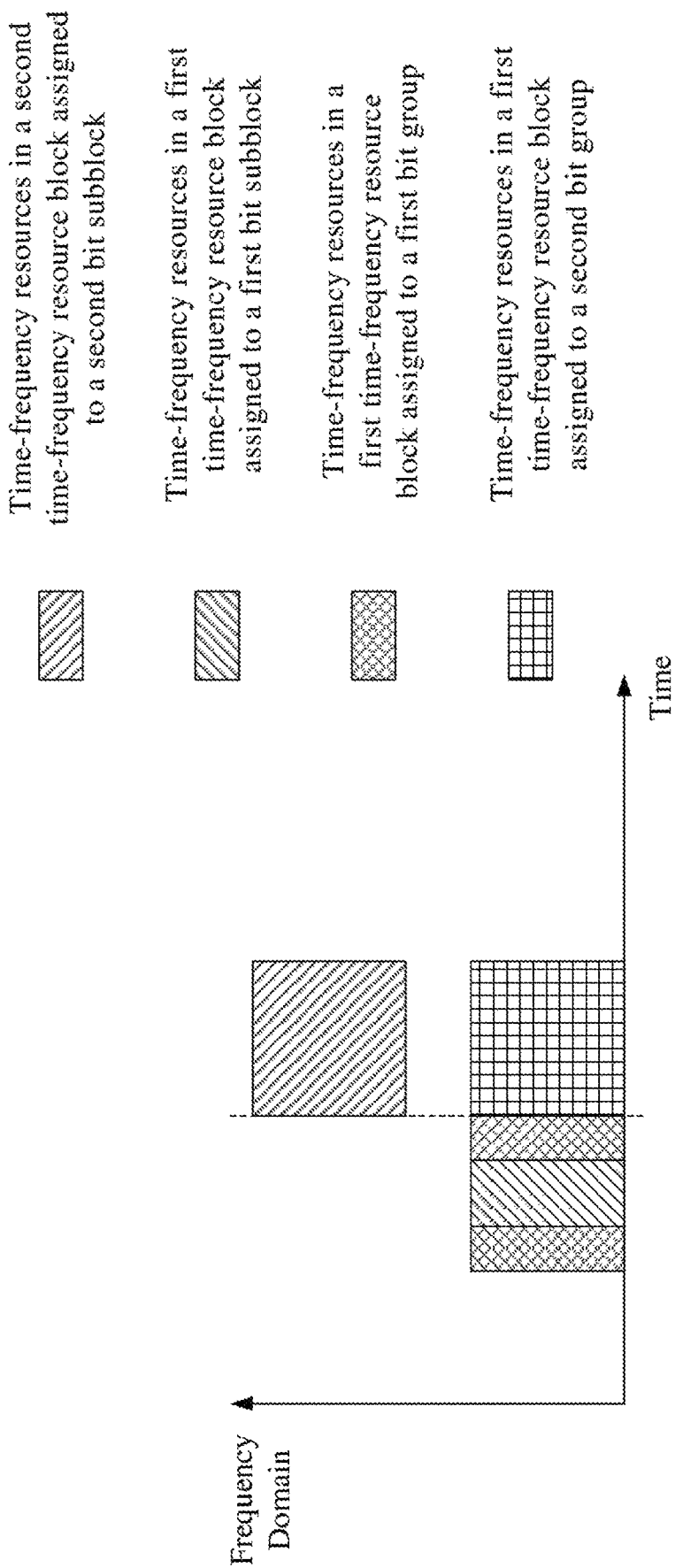
FIG. 11 is a diagram illustrating a first bit subblock, a second bit subblock and a second bit block according to the disclosure.

Embodiment 11 illustrates an example of a diagram of a first bit subblock and a second bit subblock, as shown in FIG. 11. In FIG. 11, the second bit subblock is composed of a first bit group and a second bit group, and both the first bit group and the second bit group include a positive integer number of bits; an end time of time-frequency resources in the first time-frequency resource block assigned to the first bit group is before a start time of the second time-frequency resource block, and an end time of time-frequency resources in the first time-frequency resource block assigned to the second bit group is behind a start time of the second time-frequency resource block.

In one embodiment, the UE transmits the first radio signal, and the first radio signal is generated by both the first bit subblock and the first bit group.

In one embodiment, the bits included in the first bit group and the bits included in the second bit group both are bits corresponding to an UL-SCH.

Embodiment 12

Figure 12:
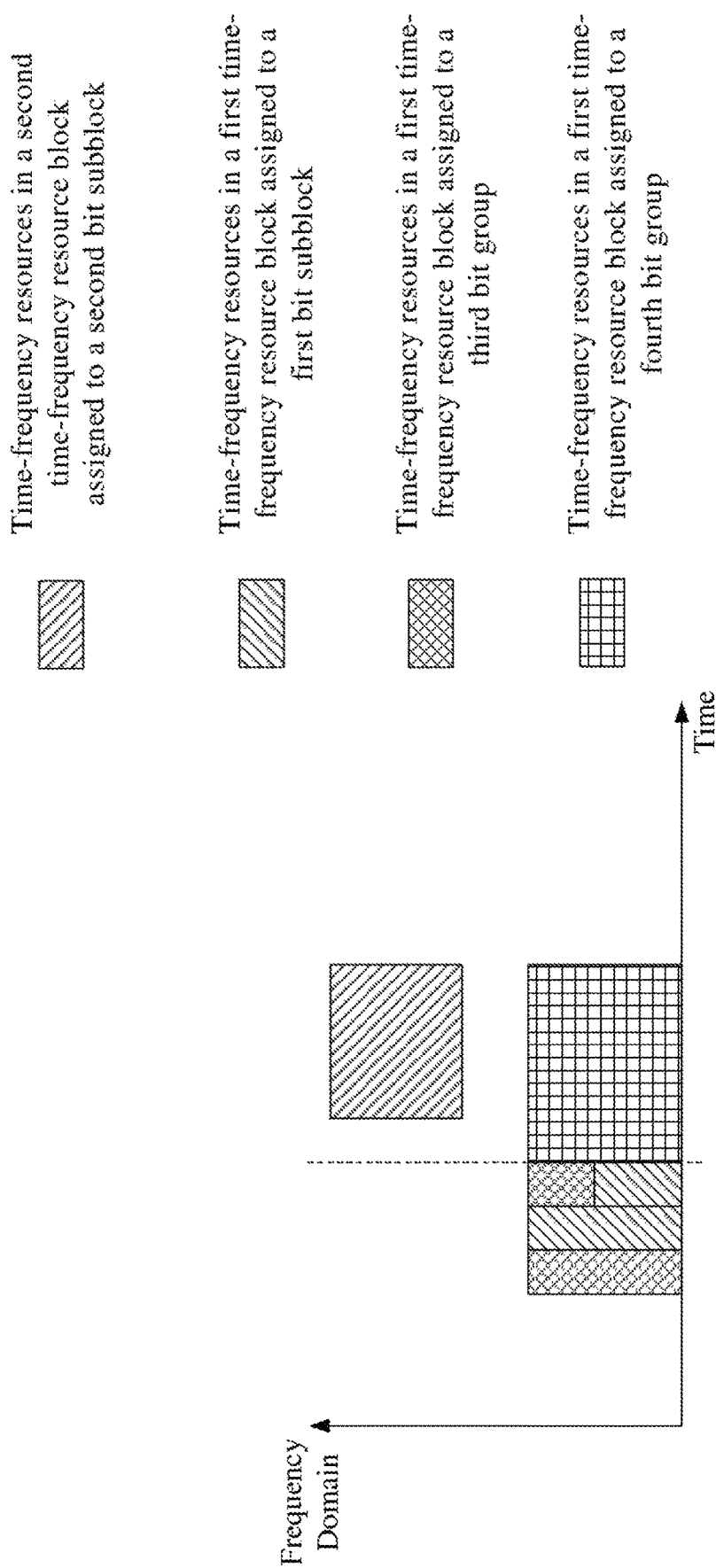
FIG. 12 is another diagram illustrating a first bit subblock, a second bit subblock and a second bit block according to the disclosure.

Embodiment 12 illustrates an example of another diagram of a first bit subblock and a second bit subblock, as shown in FIG. 12. In FIG. 12, the second bit subblock is composed of a third bit group and a fourth bit group, and both the third bit group and the fourth bit group include a positive integer number of bits; time-frequency resources in the first time-frequency resource block assigned to the third bit group are not earlier than time-frequency resources in the first time-frequency resource block assigned to the first bit subblock, and the bits included in the fourth bit group are those bits in the second bit subblock other than the third bit group.

In one embodiment, the UE transmits the first radio signal, and the first radio signal is generated by both the first bit subblock and the third bit group.

In one embodiment, the UE gives up transmitting the bits included in the fourth bit group in the first time-frequency resource block.

In one embodiment, the bits included in the third bit group and the bits included in the fourth bit group both are bits corresponding to an UL-SCH.

In one embodiment, there is one multicarrier symbol which includes both the bits in the first bit subblock and the bits in the third bit group, and the UE transmits the multicarrier symbol.

Embodiment 13

Figure 13:
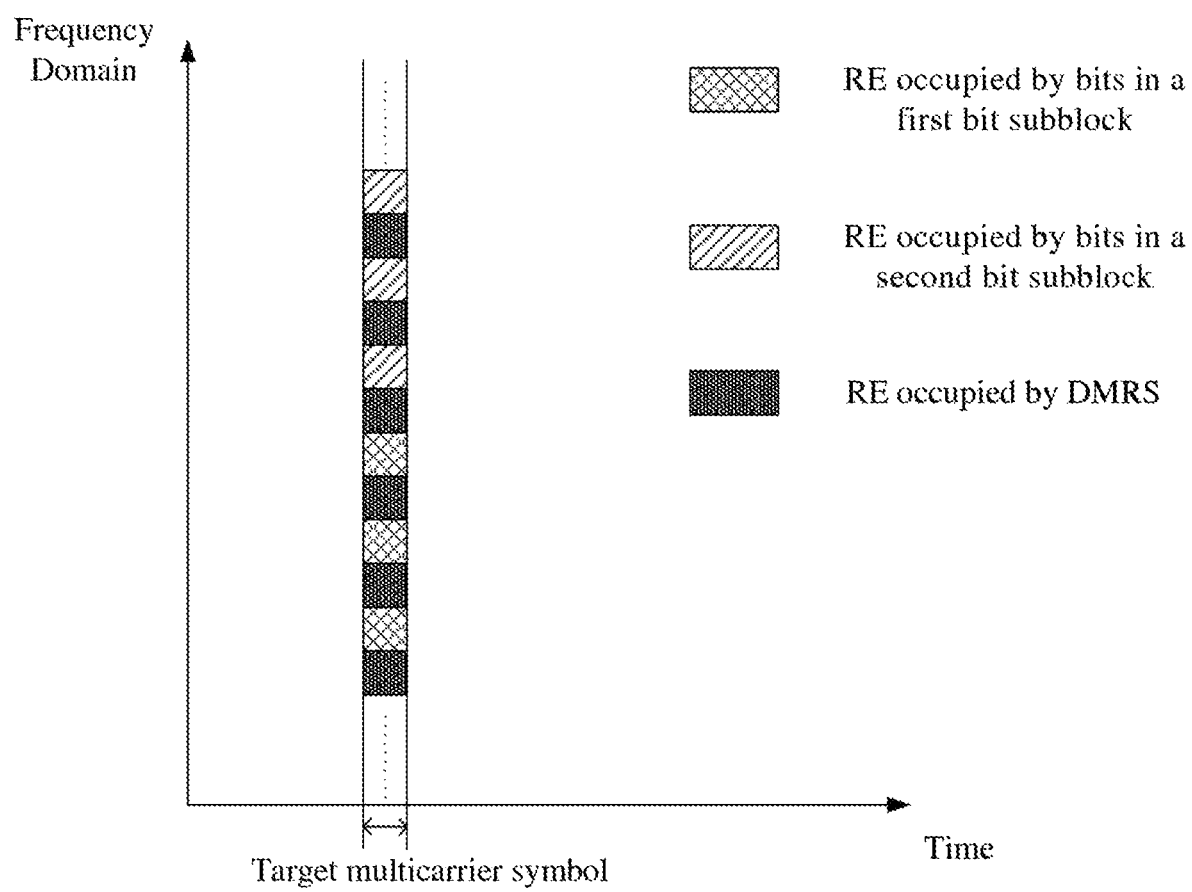
FIG. 13 is a diagram illustrating a first radio signal in one target multicarrier symbol according to the disclosure.

Embodiment 13 illustrates an example of a diagram of a first radio signal in a target multicarrier symbol, as shown in FIG. 13. In FIG. 13, time-domain resources occupied by the first radio signal include a target multicarrier symbol; partial REs in the target multicarrier symbol are used for transmission of DMRS, partial REs in the target multicarrier symbol are used for transmitting partial or all bits in the first bit subblock in the disclosure, and the rest REs in the target multicarrier symbol are used for transmitting partial bits in the second bit subblock in the disclosure.

Embodiment 14

Figure 14:
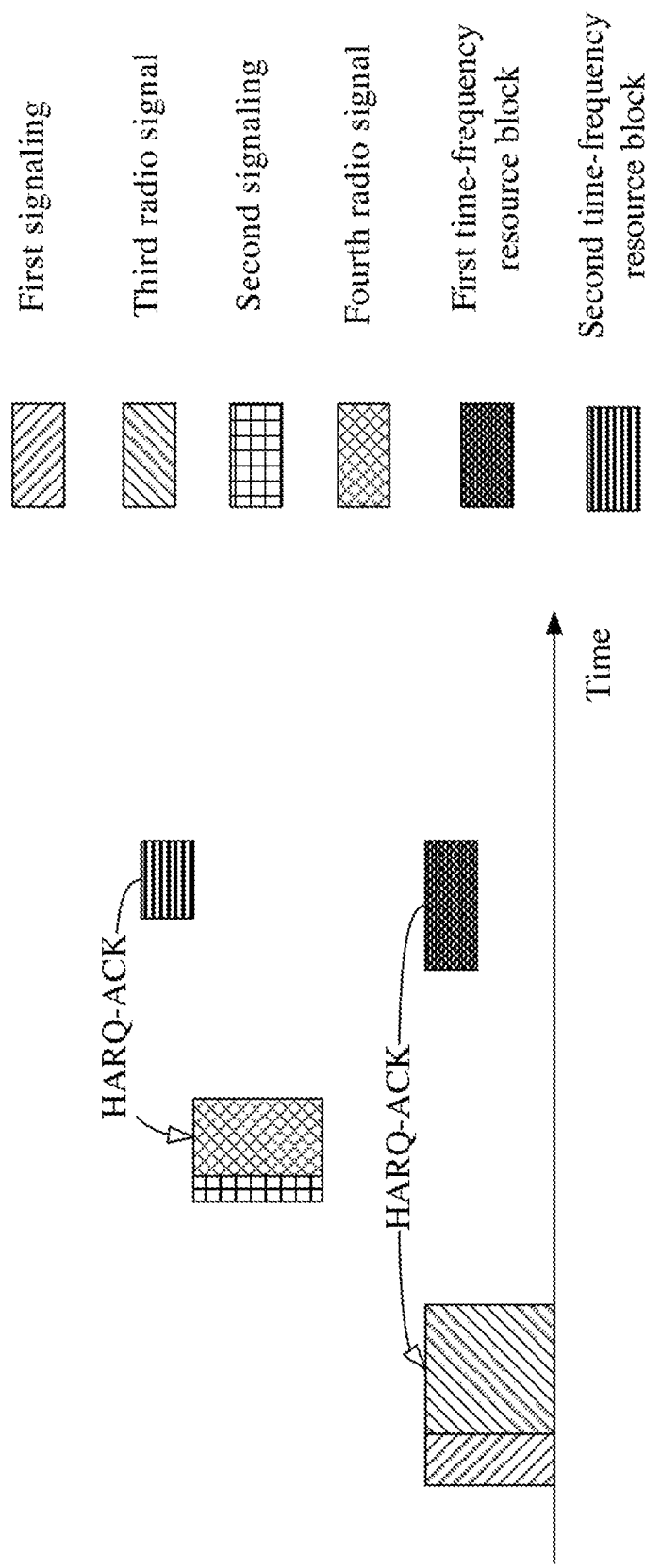
FIG. 14 is a diagram illustrating a third radio signal and a fourth radio signal according to the disclosure.

Embodiment 14 illustrates an example of a diagram of a third radio signal and a fourth radio signal, as shown in FIG. 14. In FIG. 14, the first signaling in the disclosure schedules the third radio signal, and the first signaling indicates to transmit a first bit block in a first time-frequency resource block, and the first bit block is used for determining whether the third radio signal is correctly received; the second signaling schedules the fourth radio signal, and the second signaling indicates to transmit a second bit block in a second time-frequency resource block, and the second bit block is used for determining whether the fourth radio signal is correctly received.

Embodiment 15

Figure 15:
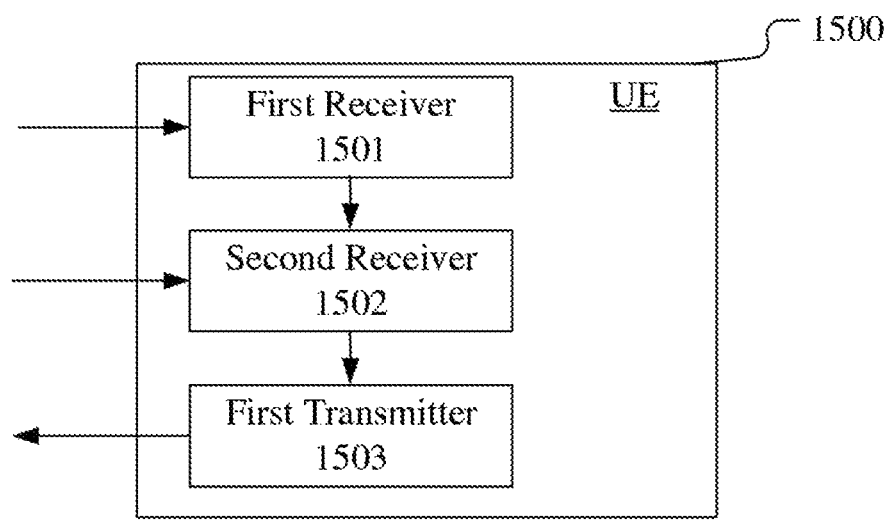
FIG. 15 is a structure block diagram illustrating a processing device in a UE according to one embodiment of the disclosure.

Embodiment 15 illustrates an example of a structure block diagram of a processing device in a UE, as shown in FIG. 15. In FIG. 15, the processing device 1500 in the UE includes a first receiver 1501, a second receiver 1502 and a first transmitter 1503.

The first receiver 1501 receives a first signaling, the first signaling indicating to transmit a first bit block in a first time-frequency resource block.

The second receiver 1502 receives a second signaling, the second signaling indicating to transmit a second bit block in a second time-frequency resource block.

The first transmitter 1603 transmits a second radio signal in the second time-frequency resource block.

In Embodiment 15, an end time of the second time-frequency resource block is behind a start time of the first time-frequency resource block, and the second bit block is used for generating the second radio signal; the first bit block includes a first bit subblock and a second bit subblock; when an end time of time-frequency resources in the first time-frequency resource block assigned to the first bit subblock is behind a start time of the second time-frequency resource block, the first transmitter 1503 further gives up wireless transmission in the first time-frequency resource block, and the second bit block includes the first bit subblock; when an end time of time-frequency resources in the first time-frequency resource block assigned to the first bit subblock is before a start time of the second time-frequency resource block, the first transmitter 1503 further transmits a first radio signal in the first time-frequency resource block, and the first bit subblock is used for generating the first radio signal.

In one embodiment, when an end time of time-frequency resources in the first time-frequency resource block assigned to the first bit subblock is before a start time of the second time-frequency resource block, the first transmitter 1503 further gives up wireless transmission after the end time of the time-frequency resources in the first time-frequency resource block assigned to the first bit subblock.

In one embodiment, the first transmitter 1503 further determines that a first time window and a second time window are overlapping in time domain; the first time window includes time-domain resources occupied by the first time-frequency resource block, and the second time window includes time-domain resources occupied by the second time-frequency resource block.

In one embodiment, the first receiver 1501 further receives a third radio signal; and the first bit subblock is used for determining whether the third radio signal is correctly received.

In one embodiment, the second receiver 1502 further receives a fourth radio signal; and the second bit block is used for determining whether the fourth radio signal is correctly received.

In one embodiment, the first receiver 1501 includes at least the former four of the antenna 452, the receiver 454, the multi-antenna receiving processor 458, the receiving processor 456 and the controller/processor 459 illustrated in Embodiment 4.

In one embodiment, the second receiver 1502 includes at least the former four of the antenna 452, the receiver 454, the multi-antenna receiving processor 458, the receiving processor 456 and the controller/processor 459 illustrated in Embodiment 4.

In one embodiment, the first transmitter 1503 includes at least the former four of the antenna 452, the transmitter 454, the multi-antenna transmitting processor 457, the transmitting processor 468 and the controller/processor 459 illustrated in Embodiment 4.

Embodiment 16

Figure 16:
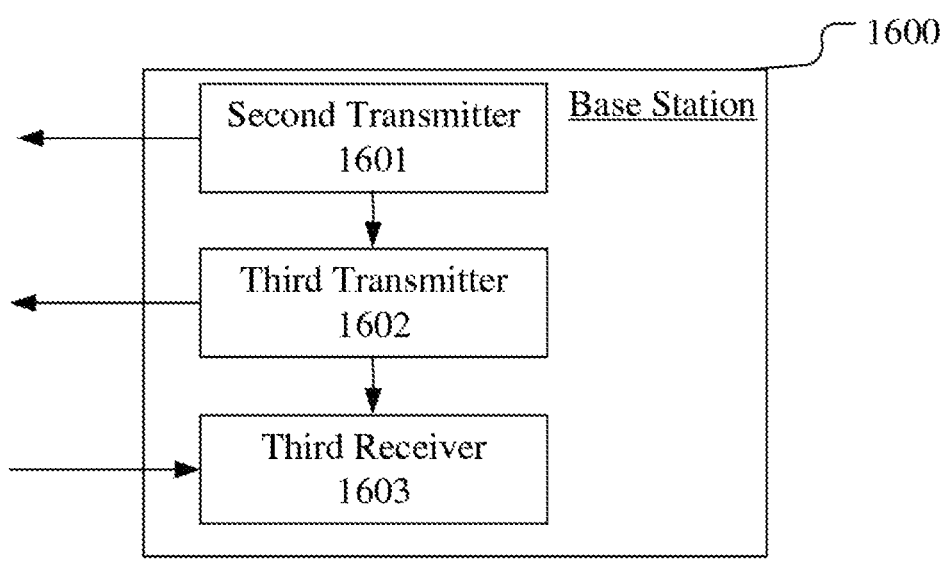
FIG. 16 is a structure block diagram illustrating a processing device in a base station according to one embodiment of the disclosure.

Embodiment 16 illustrates an example of a structure block diagram of a processing device in a base station, as shown in FIG. 16. In FIG. 16, the processing device 1600 in the base station includes a second transmitter 1601, a third transmitter 1602 and a third receiver 1603.

The second transmitter 1601 transmits a first signaling, the first signaling indicating to receive a first bit block in a first time-frequency resource block.

The third transmitter 1602 transmits a second signaling, the second signaling indicating to receive a second bit block in a second time-frequency resource block.

The third receiver 1603 receives a second radio signal in the second time-frequency resource block.

In Embodiment 16, an end time of the second time-frequency resource block is behind a start time of the first time-frequency resource block, and the second bit block is used for generating the second radio signal; the first bit block includes a first bit subblock and a second bit subblock; when an end time of time-frequency resources in the first time-frequency resource block assigned to the first bit subblock is behind a start time of the second time-frequency resource block, the third receiver 1603 gives up wireless receiving in the first time-frequency resource block, and the second bit block includes the first bit subblock; when an end time of time-frequency resources in the first time-frequency resource block assigned to the first bit subblock is before a start time of the second time-frequency resource block, the third receiver 1603 further receives a first radio signal in the first time-frequency resource block, and the first bit subblock is used for generating the first radio signal.

In one embodiment, when an end time of time-frequency resources in the first time-frequency resource block assigned to the first bit subblock is before a start time of the second time-frequency resource block, the third receiver 1603 further gives up wireless receiving after the end time of the time-frequency resources in the first time-frequency resource block assigned to the first bit subblock.

In one embodiment, the third receiver 1603 further determines that a first time window and a second time window are overlapping in time domain; the first time window includes time-domain resources occupied by the first time-frequency resource block, and the second time window includes time-domain resources occupied by the second time-frequency resource block.

In one embodiment, the second transmitter 1601 further transmits a third radio signal; and the first bit subblock is used for determining whether the third radio signal is correctly received.

In one embodiment, the third transmitter 1602 further transmits a fourth radio signal; and the second bit block is used for determining whether the fourth radio signal is correctly received.

In one embodiment, the second transmitter 1601 includes at least the former four of the antenna 420, the transmitter 418, the multi-antenna transmitting processor 471, the transmitting processor 416 and the controller/processor 475 illustrated in Embodiment 4.

In one embodiment, the third transmitter 1602 includes at least the former four of the antenna 420, the transmitter 418, the multi-antenna transmitting processor 471, the transmitting processor 416 and the controller/processor 475 illustrated in Embodiment 4.

In one embodiment, the third receiver 1603 includes at least the former four of the antenna 420, the receiver 418, the multi-antenna receiving processor 472, the receiving processor 470 and the controller/processor 475 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits.

Correspondingly, each module unit in the above embodiment may be realized in the form of hardware, or in the form of software function modules. The disclosure is not limited to any combination of hardware and software in specific forms. The first node equipment, the second node equipment and the fourth node equipment in the disclosure include but not limited to mobile phones, tablet computers, notebooks, network cards, low-power equipment, eMTC equipment, NB-IOT equipment, vehicle-mounted communication equipment, transportation tools, vehicles, RSUs, aircrafts, airplanes, unmanned aerial vehicles, telecontrolled aircrafts, and other radio communication equipment. The third node equipment in the disclosure includes but not limited to macro-cellular base stations, micro-cellular base stations, home base stations, relay base stations, eNBs, eNBs, TRPs, GNSSs, relay satellites, satellite base stations, air base stations, RSUs and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
   receiving a first signaling, the first signaling indicating to transmit a first bit block in a first time-frequency resource block;
   receiving a second signaling, the second signaling indicating to transmit a second bit block in a second time-frequency resource block; and
   transmitting a second radio signal in the second time-frequency resource block;
   wherein an end time of the second time-frequency resource block is behind a start time of the first time-frequency resource block, and the second bit block is used for generating the second radio signal; the first bit block comprises a first bit subblock and a second bit subblock; when an end time of time-frequency resources in the first time-frequency resource block assigned to the first bit subblock is behind a start time of the second time-frequency resource block, and the method in the UE for wireless communication comprises:
   giving up wireless transmission in the first time-frequency resource block;
   wherein the second bit block comprises the first bit subblock;
   when an end time of time-frequency resources in the first time-frequency resource block assigned to the first bit subblock is before a start time of the second time-frequency resource block, the method in the UE for wireless communication comprises:
   transmitting a first radio signal in the first time-frequency resource block;
   wherein the first bit subblock is used for generating the first radio signal.

2. The method according to claim 1, wherein when an end time of time-frequency resources in the first time-frequency resource block assigned to the first bit subblock is before a start time of the second time-frequency resource block, the method in the UE for wireless communication comprises:
   giving up wireless transmission after the end time of the time-frequency resources in the first time-frequency resource block assigned to the first bit subblock.

3. The method according to claim 1, comprising:
   determining that a first time window and a second time window are overlapping in time domain;
   wherein the first time window comprises time-domain resources occupied by the first time-frequency resource block, and the second time window comprises time-domain resources occupied by the second time-frequency resource block.

4. The method according to claim 1, comprising:
   receiving a third radio signal;
   wherein the first bit subblock is used for determining whether the third radio signal is correctly received.

5. The method according to claim 1, comprising:
   receiving a fourth radio signal;
   wherein the second bit block is used for determining whether the fourth radio signal is correctly received.

6. A method in a base station for wireless communication, comprising:
   transmitting a first signaling, the first signaling indicating to receive a first bit block in a first time-frequency resource block;
   transmitting a second signaling, the second signaling indicating to receive a second bit block in a second time-frequency resource block; and
   receiving a second radio signal in the second time-frequency resource block;
   wherein an end time of the second time-frequency resource block is behind a start time of the first time-frequency resource block, and the second bit block is used for generating the second radio signal; the first bit block comprises a first bit subblock and a second bit subblock; when an end time of time-frequency resources in the first time-frequency resource block assigned to the first bit subblock is behind a start time of the second time-frequency resource block, and the method in the base station for wireless communication comprises:
   giving up wireless receiving in the first time-frequency resource block;
   wherein the second bit block comprises the first bit subblock;
   when an end time of time-frequency resources in the first time-frequency resource block assigned to the first bit subblock is before a start time of the second time-frequency resource block, the method in the base station for wireless communication comprises:
   receiving a first radio signal in the first time-frequency resource block;
   wherein the first bit subblock is used for generating the first radio signal.

7. The method according to claim 6, wherein when an end time of time-frequency resources in the first time-frequency resource block assigned to the first bit subblock is before a start time of the second time-frequency resource block, the method in the base station for wireless communication comprises:
   giving up wireless receiving after the end time of the time-frequency resources in the first time-frequency resource block assigned to the first bit subblock.

8. The method according to claim 6, comprising:
   determining that a first time window and a second time window are overlapping in time domain;
   wherein the first time window comprises time-domain resources occupied by the first time-frequency resource block, and the second time window comprises time-domain resources occupied by the second time-frequency resource block.

9. The method according to claim 6, comprising:
transmitting a third radio signal;
wherein the first bit subblock is used for determining whether the third radio signal is correctly received.

10. The method according to claim 6, comprising:
transmitting a fourth radio signal;
wherein the second bit block is used for determining whether the fourth radio signal is correctly received.

11. A UE for wireless communication, comprising:
a first receiver, to receive a first signaling, the first signaling indicating to transmit a first bit block in a first time-frequency resource block;
a second receiver, to receive a second signaling, the second signaling indicating to transmit a second bit block in a second time-frequency resource block; and
a first transmitter, to transmit a second radio signal in the second time-frequency resource block;
wherein an end time of the second time-frequency resource block is behind a start time of the first time-frequency resource block, and the second bit block is used for generating the second radio signal; the first bit block comprises a first bit subblock and a second bit subblock; when an end time of time-frequency resources in the first time-frequency resource block assigned to the first bit subblock is behind a start time of the second time-frequency resource block, the first transmitter further gives up wireless transmission in the first time-frequency resource block, and the second bit block comprises the first bit subblock; when an end time of time-frequency resources in the first time-frequency resource block assigned to the first bit subblock is before a start time of the second time-frequency resource block, the first transmitter further transmits a first radio signal in the first time-frequency resource block, and the first bit subblock is used for generating the first radio signal.

12. The UE according to claim 11, wherein when an end time of time-frequency resources in the first time-frequency resource block assigned to the first bit subblock is before a start time of the second time-frequency resource block, the first transmitter further gives up wireless transmission after the end time of the time-frequency resources in the first time-frequency resource block assigned to the first bit subblock.

13. The UE according to claim 11, wherein the first transmitter further determines that a first time window and a second time window are overlapping in time domain; the first time window comprises time-domain resources occupied by the first time-frequency resource block, and the second time window comprises time-domain resources occupied by the second time-frequency resource block.

14. The UE according to claim 11, wherein the first receiver further receives a third radio signal; and the first bit subblock is used for determining whether the third radio signal is correctly received.

15. The UE according to claim 11, wherein the second receiver further receives a fourth radio signal; and the second bit block is used for determining whether the fourth radio signal is correctly received.

16. A base station for wireless communication, comprising:
a second transmitter, to transmit a first signaling, the first signaling indicating to receive a first bit block in a first time-frequency resource block;
a third transmitter, to transmit a second signaling, the second signaling indicating to receive a second bit block in a second time-frequency resource block; and
a third receiver, to receive a second radio signal in the second time-frequency resource block;
wherein an end time of the second time-frequency resource block is behind a start time of the first time-frequency resource block, and the second bit block is used for generating the second radio signal; the first bit block comprises a first bit subblock and a second bit subblock; when an end time of time-frequency resources in the first time-frequency resource block assigned to the first bit subblock is behind a start time of the second time-frequency resource block, the third receiver gives up wireless receiving in the first time-frequency resource block, and the second bit block comprises the first bit subblock; when an end time of time-frequency resources in the first time-frequency resource block assigned to the first bit subblock is before a start time of the second time-frequency resource block, the third receiver further receives a first radio signal in the first time-frequency resource block, and the first bit subblock is used for generating the first radio signal.

17. The base station according to claim 16, wherein when an end time of time-frequency resources in the first time-frequency resource block assigned to the first bit subblock is before a start time of the second time-frequency resource block, the third receiver further gives up wireless receiving after the end time of the time-frequency resources in the first time-frequency resource block assigned to the first bit subblock.

18. The base station according to claim 16, wherein the third receiver determines that a first time window and a second time window are overlapping in time domain; the first time window comprises time-domain resources occupied by the first time-frequency resource block, and the second time window comprises time-domain resources occupied by the second time-frequency resource block.

19. The base station according to claim 16, wherein the second transmitter transmits a third radio signal; and the first bit subblock is used for determining whether the third radio signal is correctly received.

20. The base station according to claim 16, wherein the third transmitter transmits a fourth radio signal; and the second bit block is used for determining whether the fourth radio signal is correctly received.

* * * * *